June 14, 1949.  A. B. DU MONT  2,472,889
PHOTOVISION

Filed Dec. 17, 1946  4 Sheets-Sheet 1

Allen B. Du Mont
by
Charles W. Mortimer, Atty.

June 14, 1949. A. B. DU MONT 2,472,889
PHOTOVISION
Filed Dec. 17, 1946 4 Sheets-Sheet 2

Allen B. Du Mont
by
Charles W. Mortimer, Atty.

June 14, 1949.  A. B. DU MONT  2,472,889
PHOTOVISION

Filed Dec. 17, 1946  4 Sheets-Sheet 3

Allen B. Du Mont
by
Charles W. Mortimer, Atty

June 14, 1949. A. B. DU MONT 2,472,889
PHOTOVISION

Filed Dec. 17, 1946 4 Sheets-Sheet 4

Allen B. Du Mont
by
Charles W. Mortimer, Atty.

Patented June 14, 1949

2,472,889

UNITED STATES PATENT OFFICE 2,472,889

PHOTOVISION

Allen B. Du Mont, Upper Montclair, N. J., assignor to Allen B. Du Mont Laboratories, Inc., Passaic, N. J., a corporation of Delaware Application December 17, 1946, Serial No. 716,846

4 Claims. (Cl. 178—5.6)

This invention relates to a television system in which a source of light or other radiant energy that can be rapidly changed in intensity, is utilized for transmitting purposes. The radiant energy that may be used includes wave lengths from about 0.01 of a micron to about 100 microns.

Reference is made to my prior Patent #1,984,673 of December 18, 1934 where a television system is described in which a high intensity light source is to be rapidly changed in intensity and modulated so that viewers at various locations could receive the picture by viewing the light source through a scanning disc and telescope. With such a system the receiver must be in the line of sight to the transmitter and the light is received through a scanning disc.

With the present invention a less high intensity radiant energy source at the transmitter can be used and it is not necessary for the viewer to be in the line of sight to the transmitter. Furthermore, transmission is not affected by sunlight or extraneous light sources and the invention can be used to transmit the pictures through fog, rain or snow. This invention is also very useful for relaying television programs from pickup points to transmitters and from city to city. One of the advantages of such a relay system is that in many places programs may be relayed even when the transmitters and receivers are not in the line of sight of each other. This invention can be used either at night or in the daytime. Due to the fact that the video amplifiers that are used are alternating current amplifiers and sunlight generates only direct current voltage, no interference results. A telescope is used, and due to the narrow beam and shielding effects of the shield on the telescope other disturbances such as electric signs do not cause interference. Other advantages are the extreme directional characteristics, low noise level and absence of multiple images due to reflections.

The invention may be understood from the description in connection with the accompanying drawings in which various embodiments of the invention are illustrated. The drawings are somewhat diagrammatic but will be readily understood by those skilled in this art.

Figure 6:
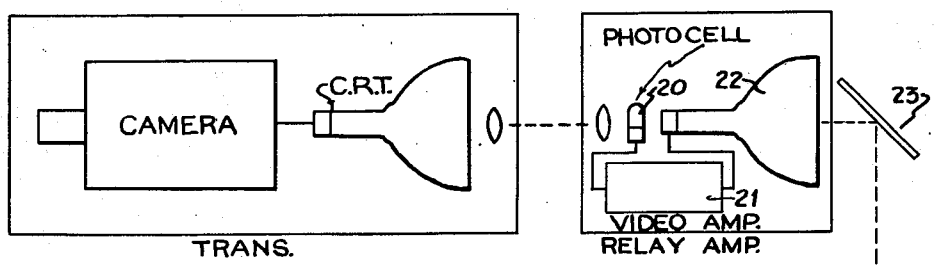

Fig. 6 indicates an inter-city relay system showing a transmitter, two relay amplifiers and receiver, and also mirrors to avoid obstructions or extend the range.

Figure 7:
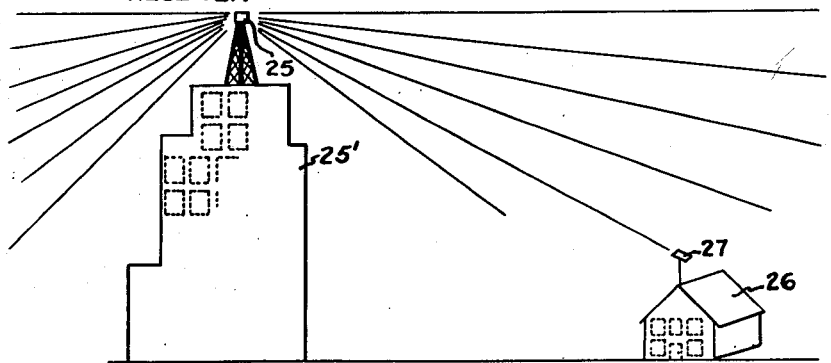

Fig. 7 is a side elevation of a photovision broadcast transmitter equipped with a Fresnel lens, and a home with photocell pickup on the roof.

Figure 7A:
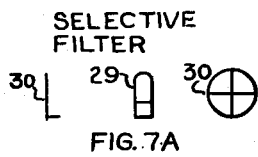

Fig. 7A shows phototube and an edge and front view of a filter.

Figure 8:
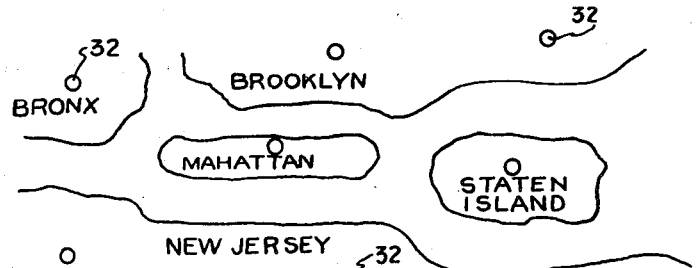

Fig. 8 is a plan view indicating illustrative locations for transmitters in New York City.

Figure 9:
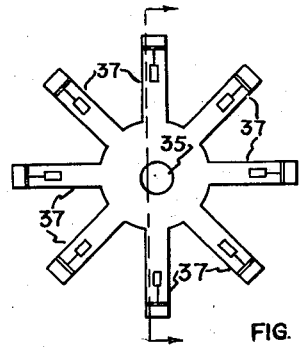

Fig. 9 is a front view of a high intensity cathode-ray tube for a beam transmitter.

Figure 10:
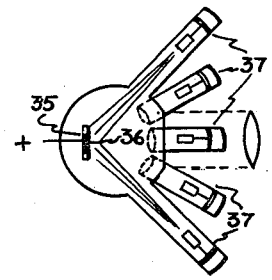

Fig. 10 is a side view of the same.

Figure 11:
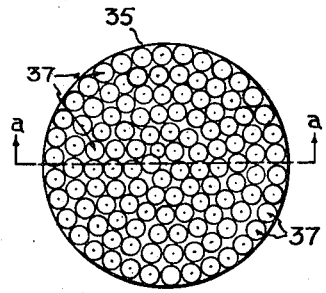

Fig. 11 is a front view of the target of a high intensity cathode-ray tube for the beam transmitter.

Figure 12:
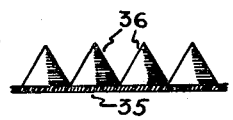

Fig. 12 is a part of a section on an enlarged scale along the line $a$—$a$ of the target shown in Fig. 11.

Figure 13:
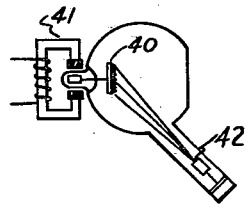

Fig. 13 is a side view of a high intensity cathode-ray tube having a rotary target.

Figure 14:
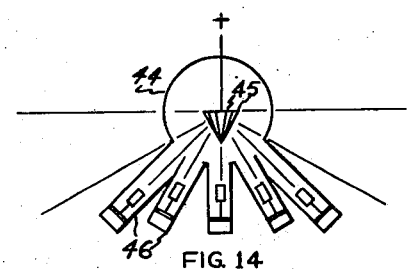

Fig. 14 is a side view of a high intensity cathode-ray tube suitable for use as a broadcast transmitter.

Figure 15:
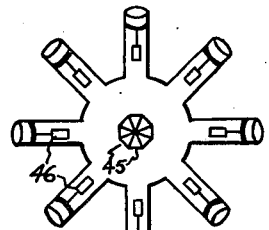

Fig. 15 is a top view of the tube shown in Fig. 14.

Figure 16:
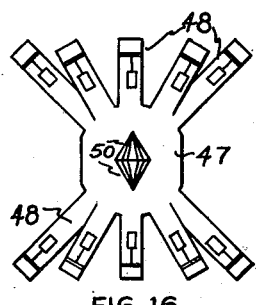

Fig. 16 is a side view of a double tube similar to that shown in Figs. 14 and 15.

Figure 17:
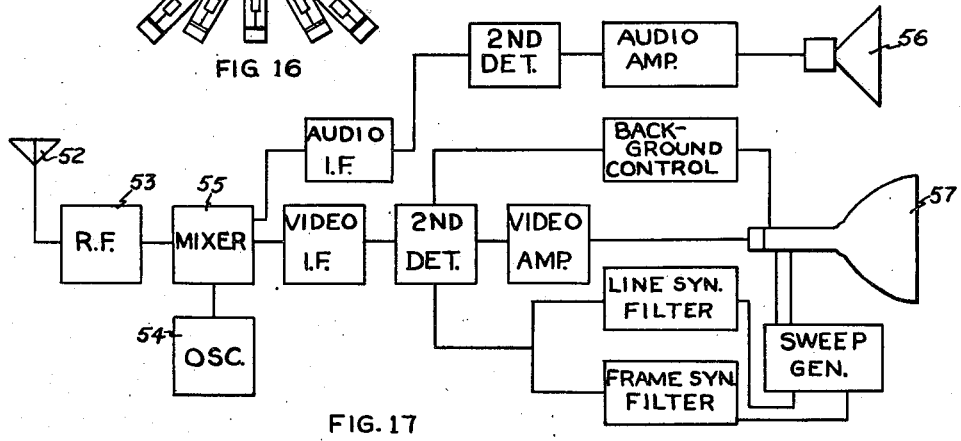

Fig. 17 is a block diagram of a normal television receiver, and

Figure 18:
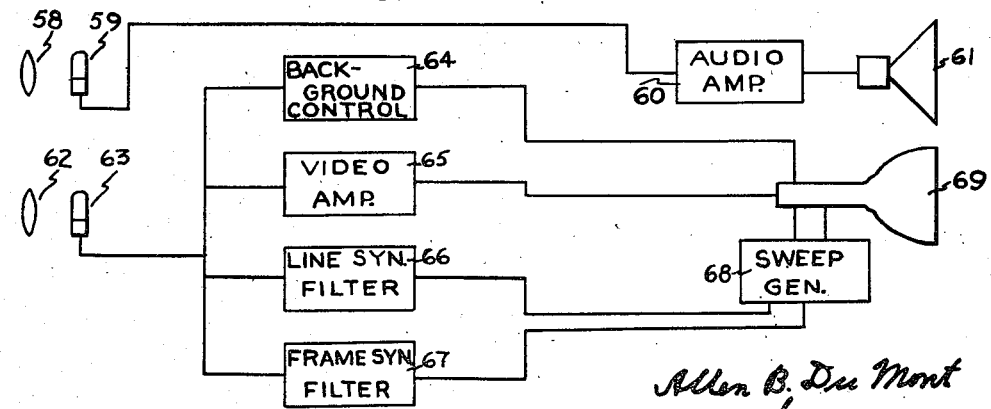

Fig. 18 is a block diagram of a photovision receiver.

Figure 1:
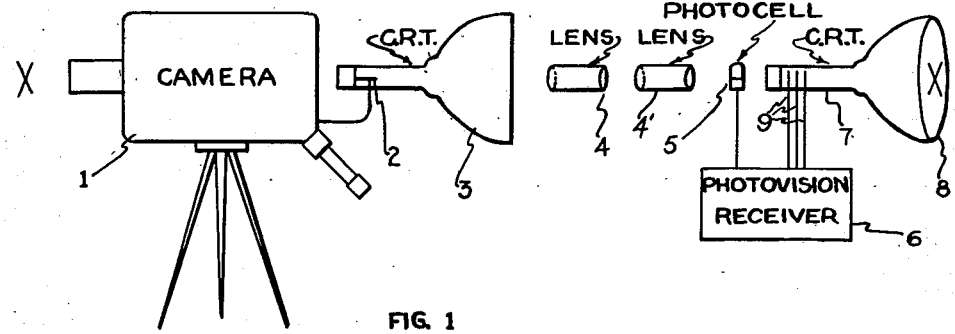
Fig. 1 is a side view of a simple photovision beam transmitter for pictures.

In the drawings reference character 1, Fig. 1, indicates a standard television camera which comprises a pickup tube, lens, video amplifier, sweep circuits, synchronizing generator and power supply of the known sort. The camera 1 is of a sort that supplies a standard television signal, comprising the video and horizontal and vertical synchronizing pulses, to the control grid 2 of the cathode-ray tube 3 thus modulating the beam which causes the fluorescent screen of this tube to vary accordingly. The tube 3 is provided with an electron gun but has no beam deflection circuits. The screen material used, may for example, be zinc oxide which I have found enables frequencies up to 5,000,000 or more cycles per second to be transmitted. By substituting other phosphors or screen materials of the known sort which radiate frequencies in the infra-red portion of the spectrum the beam can be made invisible.

Telescopes 4 and 4' are used at the transmitter and receiver, respectively, to focus the face of the cathode-ray tube 3 on photocell 5, that is located at the receiver, with minimum of loss and scattering of light. The signal from photocell 5 is transmitted to the photovision receiver 6 which is connected to the cathode-ray tube 7 thus enabling the video signals to reproduce the pictures on the face 8 of this tube in the known way. The three lines 9 are to indicate leads to the control grid and vertical and horizontal deflection means of the tube 7.

At the receiver, which may be of the known sort in use at present, a multiplier type photocell, may be used to amplify the varying light from the cathode-ray tube of the transmitter and feed it into the photovision receiver 6. This is a modified television receiver with the radio frequency oscillator, amplifier mixer and intermediate frequency amplifier and 2nd detector removed. The system can be used in the daytime or at night.

It is obvious that almost any system of carrier frequency transmission now used in radio or television can be used in this system. For instance the carrier system used by the telephone company to send 720 separate telephone messages over one coaxial cable having a frequency band of 2.7 megacycles could be used, but with the 5.0 megacycle band over 1300 separate messages could be transmitted simultaneously. With the present system wave lengths from about 100 microns to about 0.01 micron can be used.

Figure 2:
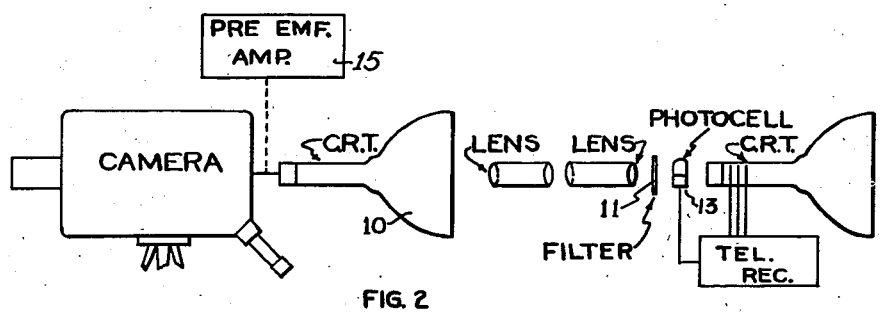
Fig. 2 is a side view of another simple photovision beam transmitter for pictures.
Figure 3:
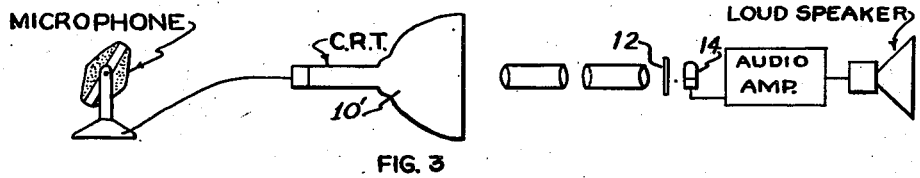
Fig. 3 is a similar view of a photovision beam transmitter for sound.
Figure 5:
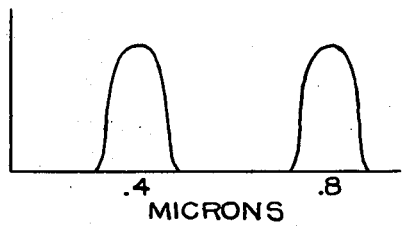
Fig. 5 is an illustrative diagram of the light output of two different cathode-ray tubes and two different filters used in front of the photocells at the receivers.

The system illustrated diagrammatically in Figs. 2 and 3 shows how voice and pictures can be transmitted simultaneously by using different phosphors on the cathode-ray tubes 10 and 10'. Different filters 11 and 12 for different wave lengths of light or radiant energy as shown in Fig. 5 can be used in front of the photocells 13 and 14. It will be understood from this disclosure that color pictures and sound can be transmitted by using four channels, one for the blue, one for the red and one for the green component and one for the sound. A pre-emphasis amplifier 15 is shown in Fig. 2 which may be used to widen the band further by accentuating the higher frequencies.

Figure 4:
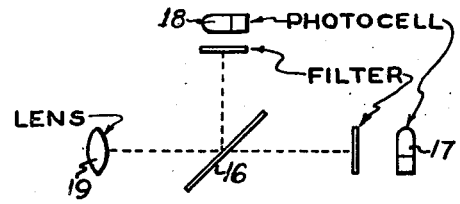
Fig. 4 is a side view of a simplified optical system used at the receiver shown in Fig. 2.

The optical part of the receiver can be modified as shown in Fig. 4 by the use of a special mirror 16 which allows part of the light to pass directly through it and through a filter to the photocell 17 and reflects part of it through another filter to the photocell 18. The light from the two transmitters is focussed by the lens 19, part of the light going to cell 17 and part to cell 18.

Fig. 6 indicates how the invention may be used in inter-city photovision circuits. The transmitter and receiver may be the same as shown and described in connection with Fig. 1 but the relay amplifier consists only of a photocell 20, a video amplifier 21 and cathode-ray tube 22. The receiver is similar to and operates in the same way as that already described. The cost of this is only a few hundred dollars as against many thousands of dollars for a television or radio relay transmitter. The mirrors 23 and 24 and the dotted lines represent change of direction of the radiant energy and distances, respectively.

Fig. 7 shows how the picture and voice may be broadcast on a photovision transmitter on frequencies from about 0.01 of a micron to about 100 microns, from a high point such as a tower 25 on the top of a high building 25'. All that is necessary for reception in a home 26 is a photocell pickup unit 27 on the roof connected by a coaxial cable to the input of the photovision receiver as shown and described more fully below in connection with Fig. 17. A photocell 29 and filter 30 which may be used in the unit 27 when it is desired to receive more than one transmitter are shown in Fig. 7A which shows a disc 30 equipped with several filters when it is desired to receive more than one transmitter.

With the present photovision system the pickup photocell 27 together with a light shield located on top of a roof like a television antenna is much smaller and easier to mount than an antenna. As to the transmitter indicated at 25 the light at it can be much weaker with the present system because a very sensitive photocell can be used at the receiver to amplify the light received by it sufficiently to show the pictures clearly on the receiver.

As illustrated in Fig. 8, which indicates a city such as New York, the circles 32 illustrate places where the photovision transmitters may be located in a large city to provide maximum coverage. In such cases each transmitter uses a frequency range different from the others.

A very high intensity light or radiant energy source may be provided for beam transmitters as shown in Figs. 9 to 16, Figs. 11 and 12 being on a larger scale than the others. The target 35 comprises numerous cones 36, coated with a suitable phosphor, to give the maximum fluorescent screen area to produce more light with minimum screen burning. It is to be understood that phosphors of different sorts may be located in separate sections of the target 35 with one or more guns 37 directed upon each of the different phosphors. In this way each section can be separately modulated thereby enabling multi-channel signals to be sent out from one tube. For example, sound and pictures can be sent or three colors and sound can be sent for color television.

As shown in Fig. 13, a rotating target 40 may be used to provide extreme brilliance. This target may be rotated by an induction motor 41 in the known way. Since cool areas of the screen materials on the target 40 are constantly coming into contact with the electron beam of the gun 42, the danger of the screen becoming burned is greatly reduced. The target 40 may be rotated for example as shown in my Patent #1,999,407.

In the modification shown in Figs. 14 and 15, a high intensity tube 44 is provided for photovision broadcasting. The number of flat triangularly shaped screen areas 45 of the target depends upon the number of guns 46 to be used.

In the modification shown in Fig. 16 a tube 47 is provided for the same purpose. It has twice as many guns 48 as the tube 44 since it has a double set of flat faces 50 which are screen areas.

Fig. 17 is a block diagram of a television receiver of the known sort in which the antenna 52 is connected to the radio frequency amplifier 53 the output of which is mixed with the output of oscillator 54 in mixer 55 to provide the intermediate frequencies for sound and picture which are fed in the known way to the loud speaker 56 where the sound becomes audible and to the tube 57 where the picture becomes visible, in the known way.

Fig. 18 is a block diagram of the present receiver system. The sound is focussed by lens 58 upon the photocell 59. The output of this cell is amplified by amplifier 60 and fed to the loud speaker 61. The picture signal is focussed by lens 62 upon photocell 63. The outputs of this cell are connected respectively through the background control 64, the video amplifier 65, the line and frame synchronizing filters 66 and 67 and sweep generator 68 to the receiver 69 where the picture becomes visible.

Although this television system is restricted to line of sight transmission unless mirrors are used, with it there is less interference and no ghost images or heterodyne interference. It provides for a wider frequency band; an unlimited number of transmitting stations can be used; the transmitters and receivers are less expensive than those now in use; and by using mirrors transmission is not limited to line of sight.

What is claimed is:

1. A television system comprising a transmitter having a television pick-up tube, a video amplifier connected thereto for amplifying the signal produced therein, horizontal and vertical sweep circuits connected to said tube to control electron beam scanning therein and horizontal and vertical synchronizing pulse generating circuits connected to said amplifier and producing a composite signal therefrom, a cathode ray tube connected to said transmitter and having a fluorescent screen, the cathode ray beam thereof being modulated by the output of said transmitter and following a unidirectional and non-scanning line to said screen producing light modulated by said signal, a receiver comprising a light pick-up tube in the path of said light for converting light energy into electrical energy, a video amplifying circuit connected to said tube for amplifying the electrical signal therefrom, synchronizing and separator circuits connected to said amplifier and a cathode ray tube connected to and controlled by said receiver circuits for presenting a television image.

2. The apparatus of claim 1 including means in said path for directing said light from said transmitter to said receiver.

3. A television system according to claim 1 including a microphone adjacent said pick-up tube for converting sound energy associated with the television picture into electrical energy, a cathode ray tube having a screen and connected to said microphone to modulate the cathode beam thereof, said beam following a unidirectional and non-scanning line in said screen, the fluorescent light output of said sound modulated cathode ray tube having a light frequency different from that of the associated video modulated cathode ray tube, a second light pick-up tube in the path of said sound modulated light for converting sound modulated light into electrical energy, an audio amplifier connected to said tube and a sound reproducing device connected to said amplifier and adjacent said cathode ray tube for reproducing the sound associated with said pictures.

4. The system of claim 1 in which said pick-up tube comprises a screen and a plurality of cathode ray beam guns aligned to produce cathode ray beams impinging upon said screen on respective separate areas thereof to produce a plurality of paths of light modulated by the output of said transmitter.

ALLEN B. DU MONT.

REFERENCES CITED

The following references are of record in the file of this patent:

UNITED STATES PATENTS

| Number | Name | Date |
|---|---|---|
| 1,844,949 | Farnsworth | Feb. 16, 1932 |
| 1,984,673 | DuMont | Dec. 18, 1934 |
| 2,072,527 | Nicolson | Mar. 2, 1937 |
| 2,191,565 | Henroteau | Feb. 27, 1940 |
| 2,227,401 | Schlesinger | Dec. 31, 1940 |
| 2,270,232 | Rosenthal | Jan. 20, 1942 |
| 2,277,516 | Henroteau | Mar. 24, 1942 |
| 2,293,899 | Hanson | Aug. 25, 1942 |
| 2,294,820 | Wilson | Sept. 1, 1942 |
| 2,335,180 | Goldsmith | Nov. 23, 1943 |
| 2,402,761 | Leverenz | Jan. 25, 1946 |

FOREIGN PATENTS

| Number | Country | Date |
|---|---|---|
| 10,447 | Austria | Dec. 6, 1932 |